C. A. DANE AND A. A. KRAEMER.
CAGE FOR ANTIFRICTION BEARINGS.
APPLICATION FILED SEPT. 1, 1920.
1,392,920.
Patented Oct. 11, 1921.
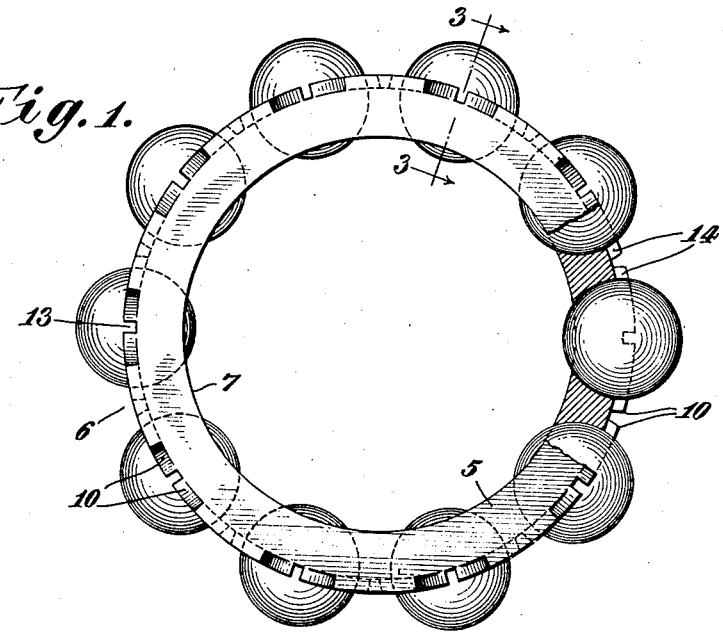
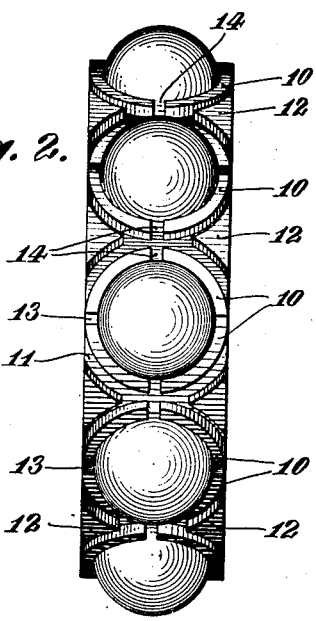
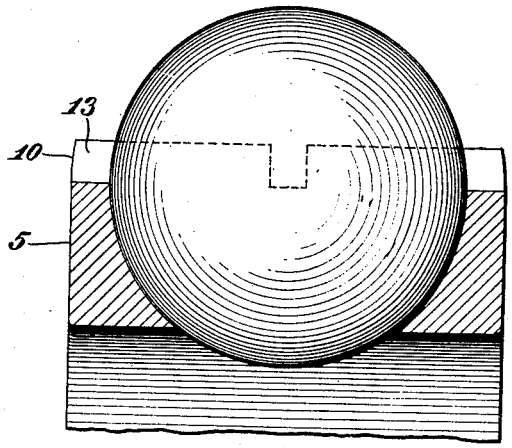
Inventors
Clayton A. Dane
Albert A. Kraemer
By their Attorneys
Rogers, Kennedy & Campbell

UNITED STATES PATENT OFFICE.

CLAYTON A. DANE AND ALBERT A. KRAEMER, OF PHILADELPHIA, PENNSYLVANIA, ASSIGNORS TO THE HESS-BRIGHT MANUFACTURING COMPANY, A CORPORATION OF DELAWARE.

CAGE FOR ANTIFRICTION-BEARINGS.

1,392,920.  Specification of Letters Patent.  Patented Oct. 11, 1921.

Application filed September 1, 1920. Serial No. 407,471.

*To all whom it may concern:*

Be it known that we, CLAYTON A. DANE and ALBERT A. KRAEMER, both citizens of the United States, residing at Philadelphia, in the county of Philadelphia and State of Pennsylvania, have invented certain new and useful Improvements in Cages for Antifriction-Bearings, of which the following is a specification, reference being had therein to the accompanying drawing.

This invention relates to ball bearings and has for an object to provide an improved device for retaining and spacing the balls of radial bearings, wherein the body of the retainer is formed of solid metal as distinguished from sheet metal, and into pockets of which the balls may be snapped by movement radially of the retainer.

In the drawings accompanying this application one practicable embodiment of the invention is illustrated, in which drawing, Figure 1 is a side view of the retainer partly broken away, a set of balls being illustrated in position in the retainer.

Fig. 2 is an edge elevation of the construction shown in Fig. 1, and

Fig. 3 is an enlarged cross section taken on a plane at about the line 3—3 of Fig. 1.

The retainer comprises an annular body 5 of solid metal, that is, this body is formed of solid metal as distinguished from sheet metal. This retainer is particularly designed for radial ball bearings in which the complement of balls may be assembled in the retainer and with them mounted in the race rings, or in which the retainer may be placed about one of the race rings and the balls snapped into position and then brought into proper relation with the other race ring. In a construction for such uses the ball pockets or sockets are disposed radially of the ring or annular body 5, each having its mouth at the outer perimeter 6, or in shop parlance the OD, and extending radially through the ring to the inner perimeter or bore 7. Both the mouth and the bottom opening of the pocket are of less diameter than the diameter of the great circle of the ball, the mouth being the larger, and the bottom opening the smaller of the two. The balls are inserted into position in the sockets or pockets by inward movement radially of the ring, and are removed by an outward radial movement.

The metal surrounding the mouth is shown formed into a plurality of resilient lips 10. These lips are of sufficient stability as well as resiliency to permit the balls to be snapped into position and retained therein, and when occasion requires to be repeatedly removed and replaced. This removal and replacement is frequently found desirable in assembling bearings by the fit and try method, which is well known to those familiar with this art.

In the present illustration each ball pocket is surrounded by four of the resilient lips 10. We have found that a simple manner of forming these lips is to make the annular body or ring rectangular in cross section, and after forming the sockets with the desired spherical walls, to cut the grooves 11 in the face of the ring concentric with the socket. It is desirable for economy of space and uniformity of elasticity to have the full amount of metal in the lips adjacent the sides of the ring, but it is not necessary to extend the metal outwardly of these lips at this point; consequently, the side lines of the body touch the side lines of the lips. In forming the annular grooves 11 there are of course left certain substantially triangular lands 12, the presence of which while in most instances not assisting the lips to perform their desired functions yet add a certain amount of stability and weight to the retainer, as well as enhancing its artistic appearance. The upstanding ring or flange from which the lips are formed is slit at a certain number of convenient positions, preferably by means of a crosswise cut 13, and a longitudinal cut 14, whereby a plurality of lips is provided, four in the illustration.

In forming the sockets which constitute the ball pockets the overhang of the lips 10 at the mouth may be effected either by an under cutting tool or by closing in such lips after their formation by a suitable upsetting tool. The slight amount of bending required to accomplish this purpose is not sufficient to impair the resiliency of the metal forming the lips so that repeated insertions and removals and replacements of the balls may be accomplished without any change in the snapping-in characteristics.

Heretofore retainers have been made of sheet metal in which the balls have been snapped into position, but so far as we are aware we are the first to provide a solid metal retainer for a radial bearing in which the balls are snapped into position by an inward movement radially of the retainer, and from the sockets of which they may be snapped by outward radial movement, and this while the first efficiency of the resilient parts is maintained inviolate.

In some aspects this improvement is of limited scope, but, however, it is obvious that in certain other aspects a considerable range of equivalency is permissible, and for that reason it is to be understood that changes of details of construction required in practice to meet the exigencies of various installations are permitted within the scope of the claims without departing from the spirit of the invention.

We claim as our invention:

1. A ball retainer comprising an annular body of solid metal formed with pockets disposed radially of such annulus and opening at the outer and the inner perimeters thereof, the sides of the annulus being continuous and closing the sides of the pocket, the metal at the mouth of each pocket being formed into a plurality of elastic lips whereby the balls may be snapped into position by movement in a direction radially of the retainer.

2. A ball retainer comprising a ring of solid metal formed with pockets disposed radially thereof, each pocket having its mouth at the outer perimeter of the ring, and the smaller opening at the bore, the metal at the mouth of the pocket being formed into a plurality of elastic lips whereby the balls may be snapped into and out of position by movement in a direction radially of the ring.

3. A ball retainer comprising a ring of solid metal being substantially rectangular in cross section, a series of ball pockets extending from the outer perimeter to the bore of the ring, there being a channel formed in the outer perimeter surrounding each of said pockets and forming an upstanding flange at the mouth thereof.

4. A retainer as called for in claim 3, wherein the upstanding flange is slit at a plurality of points for permitting the insertion and removal of balls by the snapping in method.

5. A ball retainer comprising a ring of solid metal of substantially rectangular cross sectional formation formed with pockets disposed radially thereof, there being a channel formed around the mouth of each pocket forming an upstanding flange, the side lines of the ring touching the sides of such flange, there being also a cross channel cut in the flange from side to side and a longitudinal channel thereby forming such flange into four lips.

6. A ball bearing as called for in claim 5 wherein the flange forming channels also form at the side of the ring and intermediate the pockets substantially triangular lands, their bases being at the side lines of the ring and their apices directed inwardly and on a line substantially midway between two adjacent balls.

In testimony whereof, we have affixed our signatures hereto.

CLAYTON A. DANE.
ALBERT A. KRAEMER.